June 30, 1942. G. BROULHIET 2,287,968
MEANS TO REMOTELY CONTROL DEVICES
Filed March 29, 1940 3 Sheets-Sheet 2
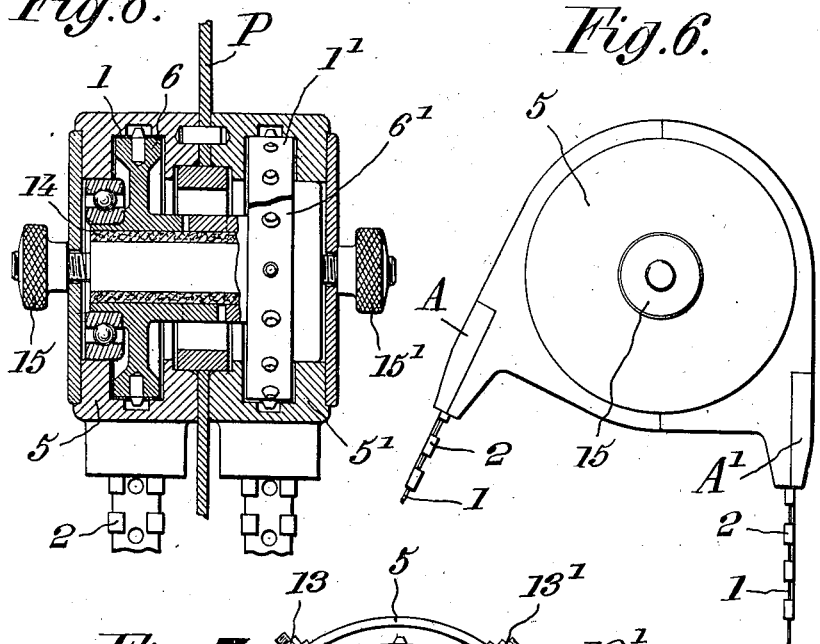
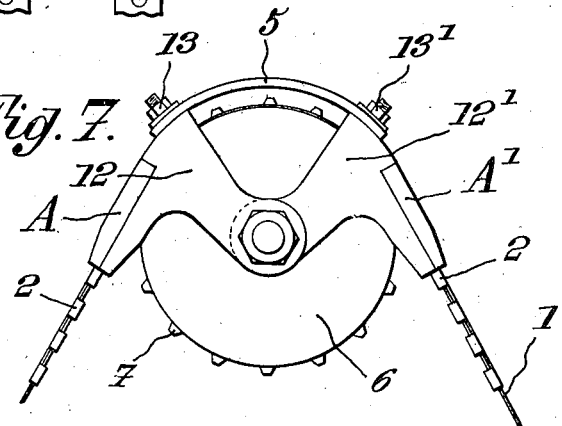
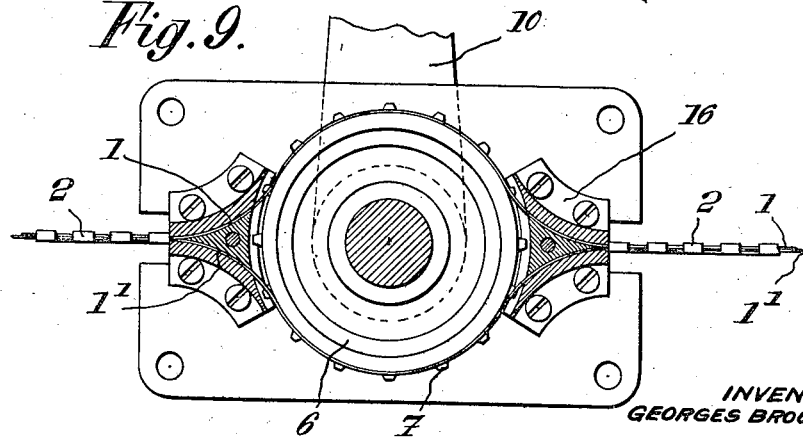
INVENTOR
GEORGES BROULHIET,
BY Bailey & Larson
ATTORNEYS June 30, 1942. G. BROULHIET 2,287,968
MEANS TO REMOTELY CONTROL DEVICES
Filed March 29, 1940 3 Sheets-Sheet 3
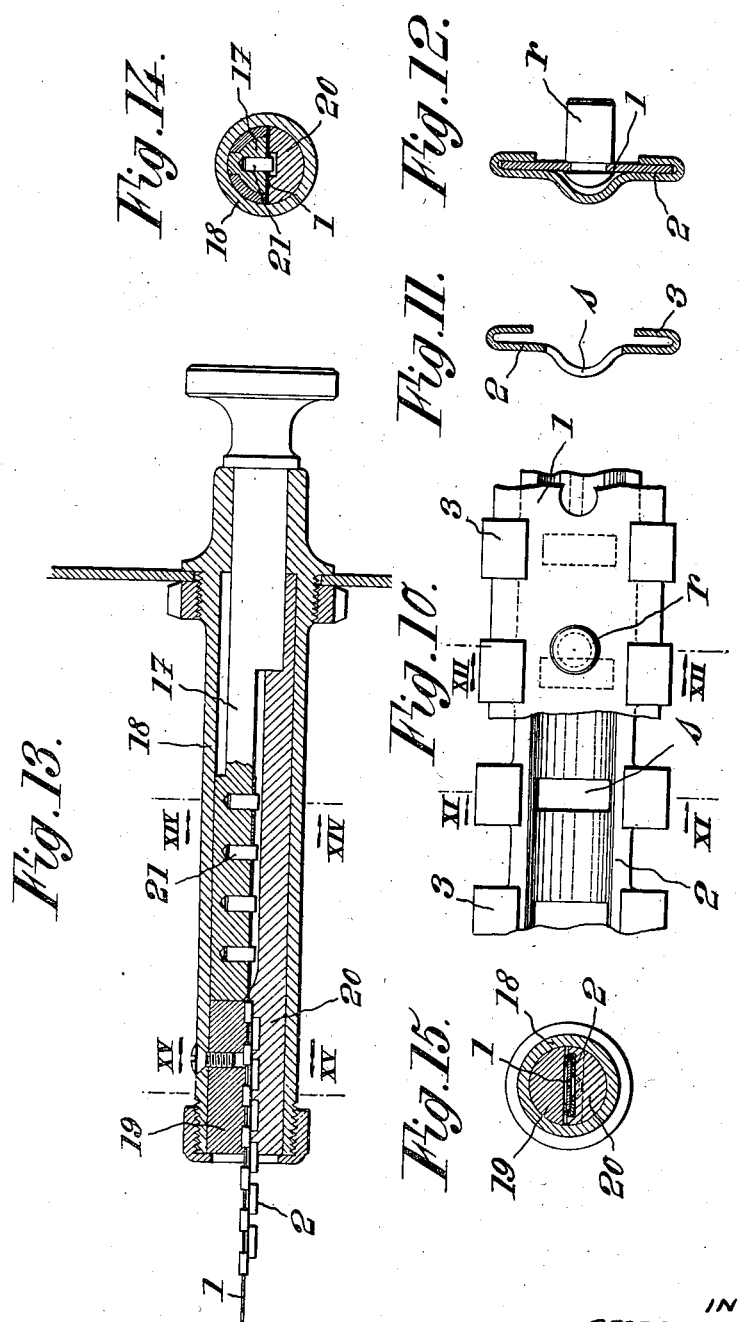
INVENTOR
GEORGES BROULHIET
BY
ATTORNEYS Patented June 30, 1942

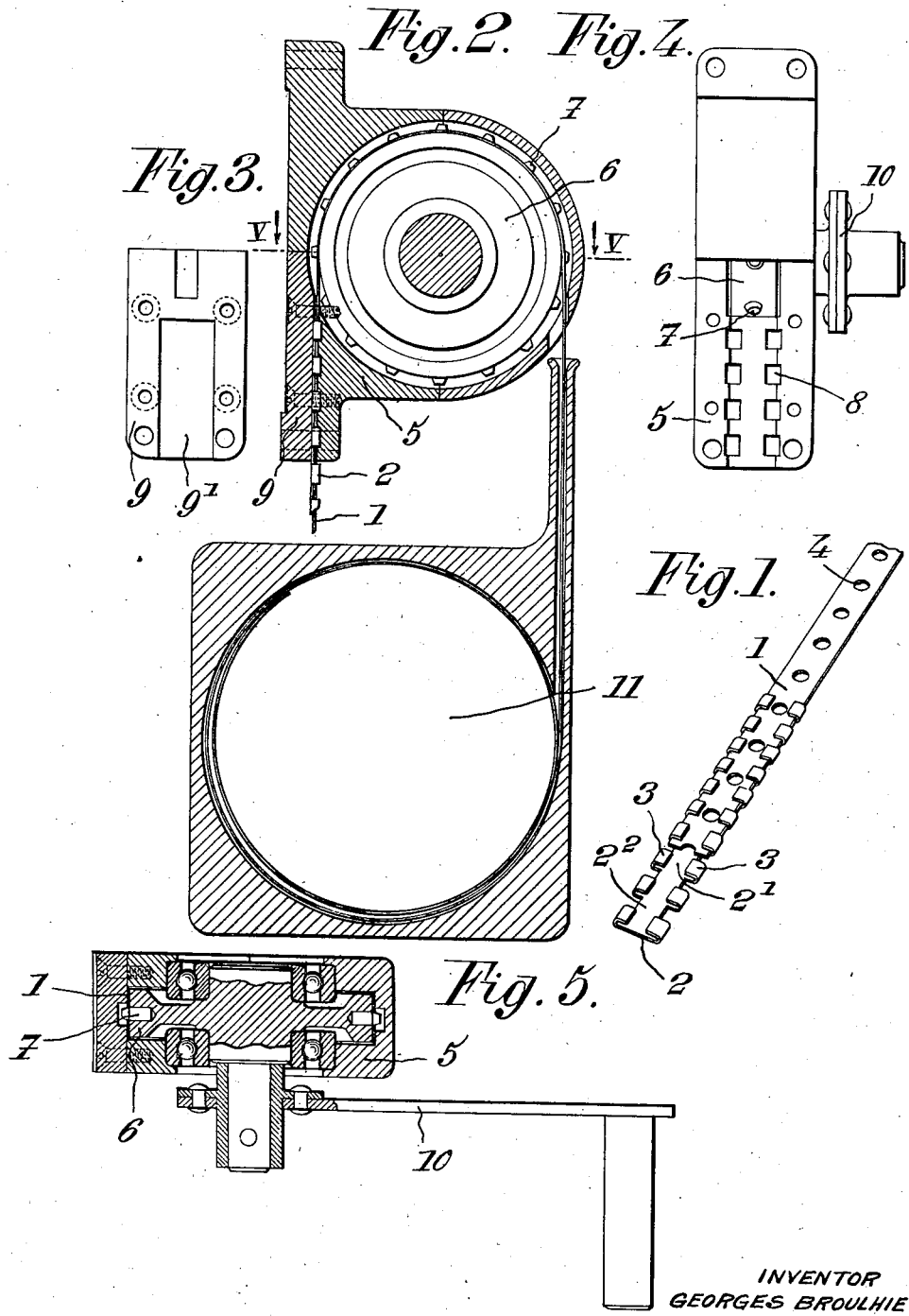

2,287,968

UNITED STATES PATENT OFFICE 2,287,968

MEANS TO REMOTELY CONTROL DEVICES

Georges Broulhiet, Paris, France

Application March 29, 1940, Serial No. 326,814
In Luxemburg March 27, 1939

4 Claims. (Cl. 74—501)

The present invention relates to remote control devices of the type essentially constituted by a flexible connecting element adapted to slide in a guide element, such as a sheath, which is generally also made flexible so as to facilitate the fitting thereof.

The chief object of the present invention is to provide a device of this type which is better adapted to meet the requirements of practice than those used for the same purpose up to the present time.

According to an essential feature of the present invention, the device in question includes a guide element provided with means for keeping the connecting element applied against it, said means being spaced apart from one another along said guide whereby the bending deformations of the guide element correspond chiefly to the portions thereof between said holding means, whereby the latter are protected against deformations as might produce a wedging of the connecting element in the guide element.

Other features of the present invention will result from the following detailed description of some specific embodiments thereof.

Preferred embodiments of the present invention will be hereinafter described with reference to the accompanying drawings, given merely by way of example, and in which:

Fig. 1 is a perspective view of the sheath or guide element, and the connecting element of a control device made according to an embodiment of the invention, Fig. 2 is a transverse section of a driving mechanism to be used in connection with the device according to the invention;

Fig. 3 is a front view of a part of this mechanism;

Fig. 4 is a front view of another part of the same mechanism;

Fig. 5 is a sectional view of the mechanism on the line V—V of Fig. 2;

Fig. 6 is an elevational view of a kind of return-pulley device according to the invention;

Fig. 7 is a view analogous to Fig. 6 but corresponding to another embodiment;

Fig. 8 is an axial section of a return pulley device made according to still another embodiment of the invention;

Fig. 9 is a transverse section of a modification of the mechanism of Fig. 2;

Fig. 10 is a plan view, with parts cut away, of a portion of a control device made according to another embodiment of the present invention;

Fig. 11 is a sectional view on the line XI—XI of Fig. 10;

Fig. 12 is a sectional view on the line XII—XII of Fig. 10;

Fig. 13 is an axial sectional view of a control device according to the invention including a rectilinear pulling element;

Fig. 14 is a sectional view on the line XIV—XIV of Fig. 13;

Fig. 15 is a sectional view on the line XV—XV of Fig. 13.

In the following description, it will be supposed that it is desired to obtain a control device of the type above referred to for transmitting to a distance movements in one direction or in the opposed direction.

According to the invention, this device is made as follows:

On the one hand, there is a connecting or coupling element, which is secured to the control member at one end, and, at the other end, to the part or parts the movements of which are to be controlled from a distance. Advantageously, according to a feature of the invention, this connecting element consists of a flexible blade or strip 1, for instance of a metallic nature.

On the other hand, there is a guide element 2, which is preferably also flexible, which is adapted, while guiding the sliding motion of strip 1, to support the reactions which take place when the operator pulls or pushes the metal strip 1.

According to the essential feature of the invention, the metal strip 1 is kept applied against the guiding member 2 through a plurality of holding elements 3 which are spaced apart from one another.

With such an arrangement, the deformations undergone by the guiding element between the controlling member and the device to be controlled correspond chiefly to the portions of said guiding element extending between two consecutive holding parts. This results from the fact that these holding parts make the portions of the guiding element on which they are mounted of greater rigidity, so that these portions are better protected against bending stresses than the remainder of the guiding element.

Consequently, when the guiding element 2 is fitted on the structure in connection with which it is used, the holding means thereof are not so deformed as to risk wedging of the connecting element 1 against the guiding face of the guide element, which occurs frequently in the case of systems in which the holding means of the guide element are continuous over the length thereof.

Furthermore, due to the fact that strip 1 is very thin, it is possible, while causing it to conform to a sinuous path including portions of very small curvature (the value of which depends merely upon the thickness of the strip), to make it capable of transmitting high stresses by correspondingly increasing the width of said strip. This is a considerable advantage over cable transmission systems, in which the transmission of important stresses implies the necessity of making use of very large circular sections, thus increasing the value of the minimum radius of curvature of the cable.

In accordance with these basic principles, in an embodiment of the invention, as shown by Fig. 1, the guiding element consists of a flexible metal band or ribbon the edges of which are symmetrically castellated or notched, and the projections of said edges are bent inwardly so as to produce along the edges of said band, hooks 3, of U shape, under which strip 1 can be engaged, as in a sheath.

It will be readily understood that the portions $2^1$ of this sheath which are located under hooks 3 are of a flexibility smaller than the intermediate portions $2^2$. It follows that these last mentioned portions support nearly the whole of the deformations imposed upon sheath 2, and that the free space existing between the branches of each hook will remain substantially uniform. Thus, with this arrangement, I eliminate any risk of wedging of strip 1 in the portions of the guiding element which are given a considerable curvature.

Concerning now the means to be provided for producing displacements of strip 1 inside sheath 2 in one direction or the other, they can be made in different manners.

According to an embodiment illustrated by the drawings, strip 1 bears against a driving drum adapted to be rotated in one direction or the other, as shown by Figs. 1 to 5.

In this embodiment, strip 1 is provided with holes 4.

On the other hand, I provide, in a frame 5, a kind of drum 6 provided, on its periphery, with a plurality of frusto-conical fingers or projections 7 disposed at intervals from one another such that, when blade 1 is brought into tangential contact with drum 6 and one of fingers 7 is engaged into a perforation or hole 4, the other fingers automatically come to engage into the adjacent holes, causing the metal strip 1 to remain applied against said drum whatever be the nature of the stresses (traction or compression) to which said strip is subjected.

I further provide means for anchoring sheath 2 with respect to frame 5. This anchoring means consists, for instance, as shown by the drawings, in providing, in said frame 5 and in a general direction tangent to drum 6, notches 8 in which are engaged the bent ends of projections 3. The end portion of sheath 2 thus anchored in frame 5 is kept in position by means of a cover 9 fixed by means of screws on said frame, said cover being provided with a recessed portion $9^1$ in which the bottom part of sheath 2 is engaged.

The drum is provided with driving means which can be constituted, for instance, by a crank arm 10.

When only one of the ends of strip 1 is secured to the part to be controlled, the structure is advantageously completed by a kind of magazine 11 on the inside of which the free end of said strip can be wound.

It should be noted, also, that by providing two anchoring means for sheath 2, corresponding respectively to the portion of strip 1 arriving to the frame and to the portion of strip 1 which leaves said frame, it is possible to make use of the whole as a kind of return pulley (either positively driven or freely pivoted) for the remote control system, this mechanism being then preferably provided at points of the path of strip 1 where the curvature is relatively sharp.

According to one embodiment, illustrated by Fig. 6, the two anchoring devices A and $A^1$ of sheath 2 are arranged in such manner as to be permanently fixed on frame 5 and the apparatus serves, in this case, merely to change the direction of strip 1 through a given angle.

According to another embodiment of the invention, illustrated by Fig. 7, the anchoring means A and $A^1$ are mounted on two pivoting supports 12 and $12^1$, coaxially mounted on drum 6, and means, such for instance as nuts 13 and $13^1$, are provided for locking these supports with respect to frame 5 once the anchoring means A and $A^1$ have been brought into the desired relative position corresponding to the angle through which the direction of strip 1 is to be turned.

According to a third embodiment, illustrated by Fig. 8, instead of forming a single return pulley, the structure is adapted to form a double return pulley system by providing on a single spindle 14 two drums 6 and $6^1$ which coact respectively with two flexible strips 1 and $1^1$ guided toward said drums by two sheath anchoring devices of the kind of those above described.

Such a system would be particularly advantageous in the case of a remote control device intended to extend across a partition P.

In this case, the frame will be made of two portions 5 and $5^1$ adapted to support drums 6 and $6^1$ respectively.

These two drum portions will be arranged on either side of partition P.

Fixation means will be provided for keeping said drum portions applied face to face with each other against partition P, on either side thereof, after said partition has been provided with a hole for the passage of spindle 14. These fixation means will consist, for instance, of two nuts 15 and $15^1$ having milled heads.

Thus, the movements transmitted through strip 1 will produce a corresponding displacement of strip $1^1$.

In all the embodiments above described, the anchoring of sheath 2 on the frame 5 of the return pulley system was imposed by the necessity of balancing the reaction on said sheath resulting from any stress exerted, in one direction or the other, on strip 1.

However, according to another embodiment illustrated by Fig. 9, the necessity of anchoring both ends of sheath 2 leading to frame 5 can be dispensed with.

For this purpose, I provide in said sheath two flexible strips 1 and $1^1$.

These two strips are caused to pass on two symmetrical zones of contact of drum 6, so that the latter (supposing that it serves to drive strip 1) imparts to said strips efforts which are equal in magnitude but opposed in direction, and which therefore do not produce any substantial reaction on the above mentioned portions of the sheath, which must merely be applied against curved guides 16 adapted to ensure a correct engagement of strips 1 and $1^1$ on drum 6.

It will be advantageous, in some cases, to arrange sheath 2 according to a modification illustrated by Figs. 10 to 12. In this case, the sheath is gutter-shaped, and transverse slots s are provided in the gutter-shaped portion, under hooks 3, so as to permit of anchoring said sheath on a surface provided with transverse projections or ridges. The presence of this gutter permits of fixing on strip 1 rivets r or other elements the heads of which can then project toward sheath 2 without however rubbing against the bottom of said sheath as would be the case if this bottom were flat.

It has been supposed, in the preceding description, that strip 1 were driven through a rotating member, but it might also be driven by a reciprocating member, such for instance as a sliding piece 17.

In this case, I have found that it is advantageous to have recourse to the embodiment illustrated by Figs. 13 to 15.

In this embodiment, sheath 2, which is preferably given the gutter-shaped section shown by Figs. 11 and 12, is secured to the end of a sleeve 18 acting as guide for sliding piece 17. For instance, sheath 2 is caught between two semi-cylindrical elements 19 and 20.

Said sliding piece is provided with a plurality of fingers 21 adapted to engage in the holes 4 of the free end of strip 1.

All these parts are dimensioned in such manner that strip 1 is always guided between the sliding piece proper and the lower semi-cylindrical piece 20, whereby said strip cannot buckle when sliding piece 17 undergoes compression stresses.

Whatever be the particular embodiment of my invention which is chosen, I obtain a device which operates in a manner resulting sufficiently clearly from the above indications for making it unnecessary to enter into further explanations.

In all cases, such a system, which is well adapted to the control from a distance of any kind of mechanism whatever (especially to the control of devices located in parts of aircrafts that cannot be reached) has many advantages:

First of all, whatever be the importance of the efforts that are transmitted, the device can be fitted along a line including curves of very short radius, owing to the plane shape of the strip which constitutes the transmission element.

On the other hand, the operation of such a device is perfectly reliable, due to the fact that the connecting element cannot be wedged in its guiding sheath.

Furthermore, this device is very easy to fit since it suffices, after having cut the strip and the sheath to the desired length, to anchor said sheath and to bring said strip into mesh with its drum and its controlled member.

Finally, in the case of a system driven by means of a drum, it is possible to transmit efforts as high in one direction as in the other direction because the adhesion of the strip on the drum is ensured as well when said strip is subjected to compression efforts as when it is subjected to traction efforts.

It should be noted that sheath 2 is not necessarily made of a flexible matter, but that its fitting in position would, for instance, be facilitated by making it of a malleable metal.

Of course, in the example above described, the hooks are integral with the sheath, but they might be fixed thereto.

The strip 1 which forms the transmission or connecting element might be guided in a continuous manner over a portion of its length.

Said connecting element, instead of being flat, might be of any other suitable shape, for instance cylindrical, the cross section of the sheath being chosen of corresponding shape, but the holding means remaining spaced apart from one another according to the essential feature of the present invention.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A a control device of the type described, which comprises in combination, a thin flexible guiding element having flat guiding surfaces, a flat thin flexible transmission strip slidable in said guiding element, and means on said guiding element for holding said transmission element against said flat guiding surfaces of said guiding element, said guiding element being bowed transversely between said guiding surfaces and having a greater resistance to bending along lines running transversely across the guiding surfaces of said guiding element than said transmission strip.

2. A control device of the type described, which comprises, in combination, a fixed frame, a guiding element consisting of a flexible band bowed transversely intermediate its side edges and anchored at one end in said frame, a flat thin transmission strip superposed to said flexible band and slidable thereon, parts carried by said flexible band for holding said strip in contact with said flexible band during sliding movement between said strip and band, said parts being spaced apart from one another along the length of said flexible band, a piece movably mounted with respect to said frame, engagement means for interconnecting said strip with said piece so as to prevent relative sliding displacements of said strip and said piece, and control means for producing displacements of said piece with respect to said frame.

3. A control device according to claim 2 in which said piece is movable in said frame with a rectilinear movement.

4. A control device according to claim 2 in which said piece is movable in said frame with a rectilinear movement, further including means for guiding said strip in said frame so as to prevent buckling of said strip.

GEORGES BROULHIET.